US009397952B2

(12) United States Patent
Liu et al.

(10) Patent No.: US 9,397,952 B2
(45) Date of Patent: Jul. 19, 2016

(54) SEGMENT BASED SWITCHING ARCHITECTURE WITH HYBRID CONTROL IN SDN

(71) Applicant: Futurewei Technologies Inc., Plano, TX (US)

(72) Inventors: Fangping Liu, San Jose, CA (US); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 137 days.

(21) Appl. No.: 14/479,027

(22) Filed: Sep. 5, 2014

(65) Prior Publication Data

US 2016/0072718 A1    Mar. 10, 2016

(51) Int. Cl.
  *G06F 15/173*   (2006.01)
  *H04L 12/891*   (2013.01)
  *H04L 12/751*   (2013.01)

(52) U.S. Cl.
  CPC ............... *H04L 47/41* (2013.01); *H04L 45/02* (2013.01)

(58) Field of Classification Search
  CPC ......... H04L 45/38; H04L 45/64; H04L 41/12; H04L 49/70; H04L 41/0893; H04L 67/10; H04L 12/4633; G06F 9/45533; G06F 9/45558; G06F 2009/45595; G06F 2009/4557; G06F 13/128; H04W 76/022
  See application file for complete search history.

(56) References Cited

U.S. PATENT DOCUMENTS

| 2014/0112190 A1* | 4/2014 | Chou | H04L 41/0213 370/254 |
| 2014/0112192 A1* | 4/2014 | Chou | H04L 41/042 370/254 |
| 2014/0157397 A1* | 6/2014 | Dalal | G06F 13/1605 726/13 |
| 2014/0201642 A1* | 7/2014 | Vicat-Blanc | H04L 41/22 715/736 |
| 2014/0229630 A1* | 8/2014 | Narayanan | H04L 45/38 709/238 |

* cited by examiner

*Primary Examiner* — Peling Shaw
(74) *Attorney, Agent, or Firm* — Futurewei Technologies, Inc.

(57) ABSTRACT

A segment based switching architecture with hybrid control providing flow control in software defined networking (SDN). An SDN controller controls top tier macro-flows and virtual segment backbone connections in a network, and an SDN network edge device controls and manages micro-flows that are attached to the SDN network edge device. The SDN network edge device controls and manages the micro-flows locally without using a southbound API. The SDN network edge device learns flow information such as source information and incoming port information for all unknown micro-flows belonging to defined segments, and builds a virtual segment topology database for each segment. The SDN network edge device employs flow computation algorithms and micro-flow management in a distributed fashion. The virtual segment backbone connections are naturally exposed to the SDN controller through provisioning.

20 Claims, 6 Drawing Sheets

| VLAN | VLAN PRIORITY | (VIRTUAL) PORT | SMAC | DMAC | ETYPE | SIP | DIP | DSCP | L4_PROTOCOL | L4_SPORT | L4_DPORT |
|---|---|---|---|---|---|---|---|---|---|---|---|
| 20 | 2 | 3 | 0x0202 | 0x0606 | 0x0806 | | | | | | |
| 20 | 3 | 3 | 0x0202 | 0x0606 | 0x0800 | 1.1.1.1 | 2.2.2.2 | 38 | 17 | 10200 | 420 |
| 20 | 3 | 300 | 0x0606 | 0x0202 | 0x0800 | 2.2.2.2 | 1.1.1.1 | 38 | 17 | 420 | 10200 |
| | | | | | | | | | | | |
| | | | | | | | | | | | |

SEGMENT BASED SWITCHING ARCHITECTURE WITH HYBRID CONTROL IN SDN

TECHNICAL FIELD

The present disclosure relates generally to software defined networking (SDN), and more particularly to network data flow control in an SDN.

BACKGROUND

In conventional SDN with OpenFlow as the south bound application programming interface (API), network devices switch flows, and the routes/paths of the flows are computed by SDN controllers. This is a data driven flow forwarding paradigm with fully centralized control, where the SDN controllers need to know all aspects of all flows. This paradigm implies a scalability issue which if not addressed will limit the applicability of SDN.

In middle to large scale data center networks, the typical number of virtual machines (VMs) running in servers will be in the range of hundreds of thousands to millions. To handle communication among the VMs, the controllers need to:
1. Deal with handshaking (first few) packets of each flow;
2. Compute paths for each flow and manage the flows.

This could mean millions of packets per second for controller CPU to process, and tens of millions of flows to compute and manage. This is a big challenge, as it is difficult and expensive to build controllers or controller cluster of this scale with today's technology.

SUMMARY

The present disclosure provides a hybrid control architecture in SDN with segment based switching. A hybrid control and distributed control of micro-flows enables the SDN network scalability to be greatly improved, allowing faster flow discovery and flow setup, and smooth and quick station mobility.

According to a first example embodiment of the disclosure, an SDN controller (or a cluster of SDN controllers) controls top tier macro-flows and virtual segment backbone connections in a network, and a plurality of SDN network Edge devices control and manage micro-flows that are directed to the SDN network Edge devices. An SDN network Edge device, such as an SDN switch, controls and manages the micro-flows locally without using a southbound API. An SDN network Edge device learns all relevant flow information such as source information and incoming port information for all unknown micro-flows in defined network segments, and builds a virtual segment topology database for each such segment. The SDN network Edge devices employ flow computation algorithms and micro-flow management in a distributed fashion. The virtual segment backbone connections are naturally exposed to the SDN controller through provisioning. The SDN switch is configured to enable and disable segment micro-flow distributed control, and implement security check, policy control, topology discovery and building, and path computing algorithms for the micro-flows.

In another example embodiment of the disclosure, an SDN network Edge device is configured to control and manage micro-flows for virtual segments in a network that are attached to the SDN network Edge device, without using a southbound API coupled to an SDN controller for these micro-flows. The SDN network Edge device is configured to learn relevant flow information such as source information and incoming port information for all unknown micro-flows in the defined segments, and build a virtual segment topology database for each segment. The SDN network Edge device is configured to employ flow computation algorithms and micro-flow management in a distributed fashion. The SDN Edge device is configured to control bottom tier micro-flows for the virtual segments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
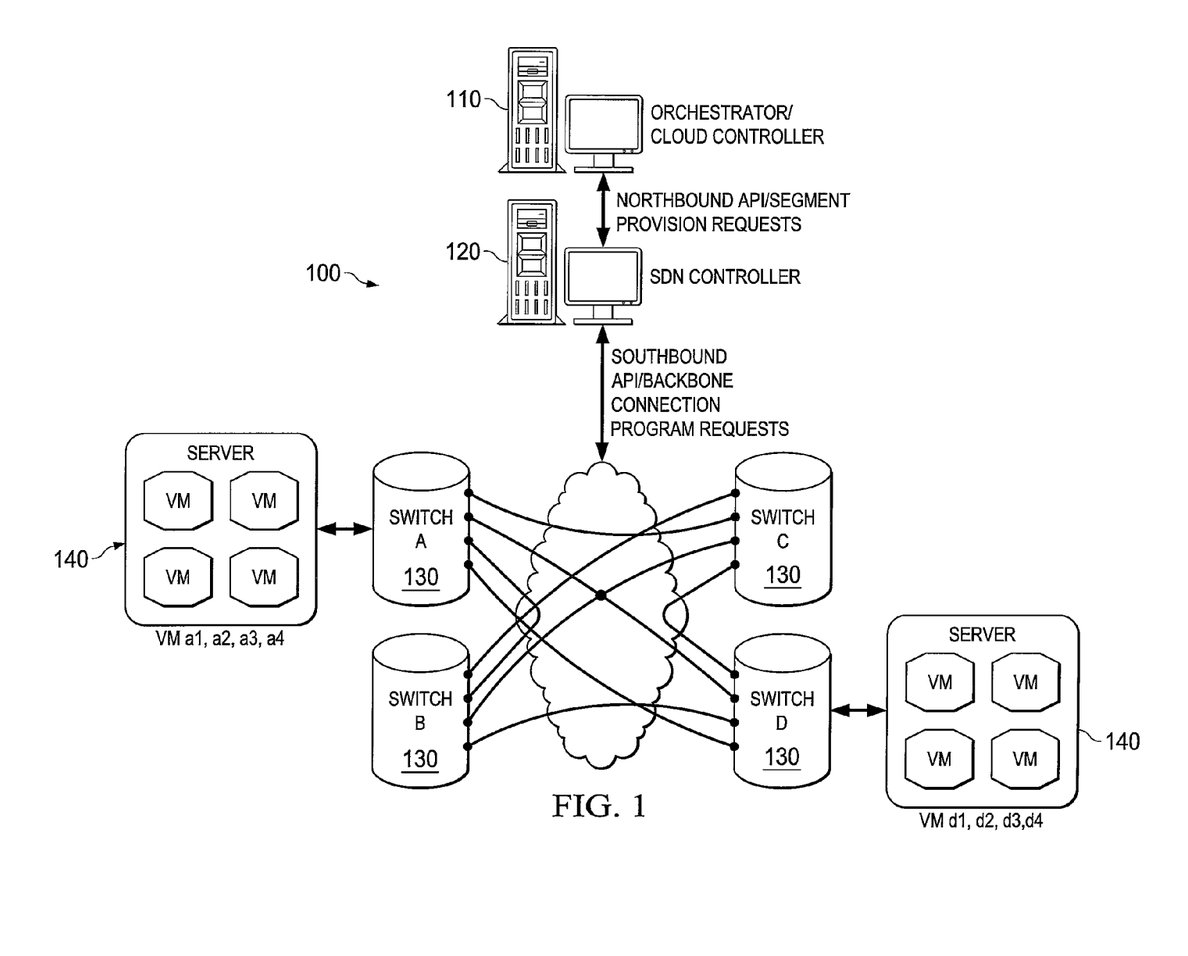
FIG. 1 illustrates an SDN network according to this disclosure.

FIG. 1 illustrates an SDN network at 100. The network 100 comprises at least one orchestrator/cloud controller 110, at least one SDN controller 120, and a plurality of SDN Edge network devices 130, such as SDN switches. The orchestrator 110 provides provision segments, and sends requests to the SDN controllers 120 through a northbound API. The SDN controllers 120 compute backbone connections, and send programming requests to the network devices 130 through a southbound API. The network devices 130 connect to and support devices 140, such as servers, which in one embodiment may be virtual machine (VM) servers. According to the present disclosure, the network devices 130 program segment requests from the SDN controllers 120 to a datapath pipeline, detect unknown micro-flows belonging to known segments, discover and learn VM addresses, forward micro-flow packets to local physical ports or backbone connections based on computed flow paths, and handle service/resource guarantees and backbone connection failovers based on programming requests.

According to the present disclosure, the SDN network data flow control is split into two tiers. A top tier consists of macro-flows, and the control is centralized at the SDN controllers 120. A bottom tier consists of micro-flows, and the control for micro-flows are distributed and performed at the SDN switches 130. This is achieved through following steps.

A provision driven virtual segment based networking paradigm achieves natural separation of the two tier control. This paradigm supplements and works with the original data driven paradigm. For client traffic (packets with sources and destinations outside the network devices), the network applications are grouped, and the network communication is separated into virtual segments. In many scenarios the network segmentation is natural and logical; e.g., in a cloud network each client can be a separate segment. Note each segment must be easily identified either through the access connections or through packet classification.

The SDN network 100 provides virtual backbone connections (or tunnels) for each segment. The backbone connections for each segment interconnect all devices 140 that host the stations/VMs/applications belonging to the segment.

The virtual segment creation/resource binding of the segment in the network 100 is on demand. It is provisioning driven and includes service guarantees, including quality of service (QoS), latency, lossful, or best effort guarantees.

SDN controllers 120 manage the backbone connections for all segments. Upon provisioning requests, the SDN controller 120 is responsible to compute paths and resources for backbone connections based on service guarantees and network design, and request network devices to program the connections through the southbound APIs. The backbone connections include point-to-point connections, and possibly also include point-to-multipoint connections for unknown destination or multi-destination packets.

Advantageously, the SDN Edge network devices 130, not SDN controllers 120, handle flow establishment, forwarding and flow aging for micro-flows belong to each virtual segment. The SDN controllers 120 do not deal with individual flows inside each segment. i.e., network devices 130 do not send handshaking packets for individual flows to the SDN controllers 120 for packet forwarding or path computation.

The SDN Edge network devices 130 learn station addresses. The SDN Edge network devices 130 form a topology database for each virtual segment, implement flow computing algorithms to compute paths for micro flows; micro-flow forwarding uses the computed paths.

For packets with unknown destination addresses, broadcast addresses, or multicast addresses belonging to a segment, the SDN Edge network devices 130 use the point-to-multipoint connections to forward them; the paths used are also computed from the topology database mentioned above.

Station movement is supported through the dynamic address learning and topology convergence. As this involves only the Edge network devices 130 on the path, without involving any SDN controllers 120, station movement is handled in a more responsive and scalable way.

Distributed Segment Micro-Flow Control

The distributed segment micro-flows control allows each network device 130, comprising an SDN Edge switch, to make decisions for micro-flows with segments.

In segment based switching, only Edge switches 130 need to deal with micro-flows, and non-edge switches only see macro-flows.

Figure 2:
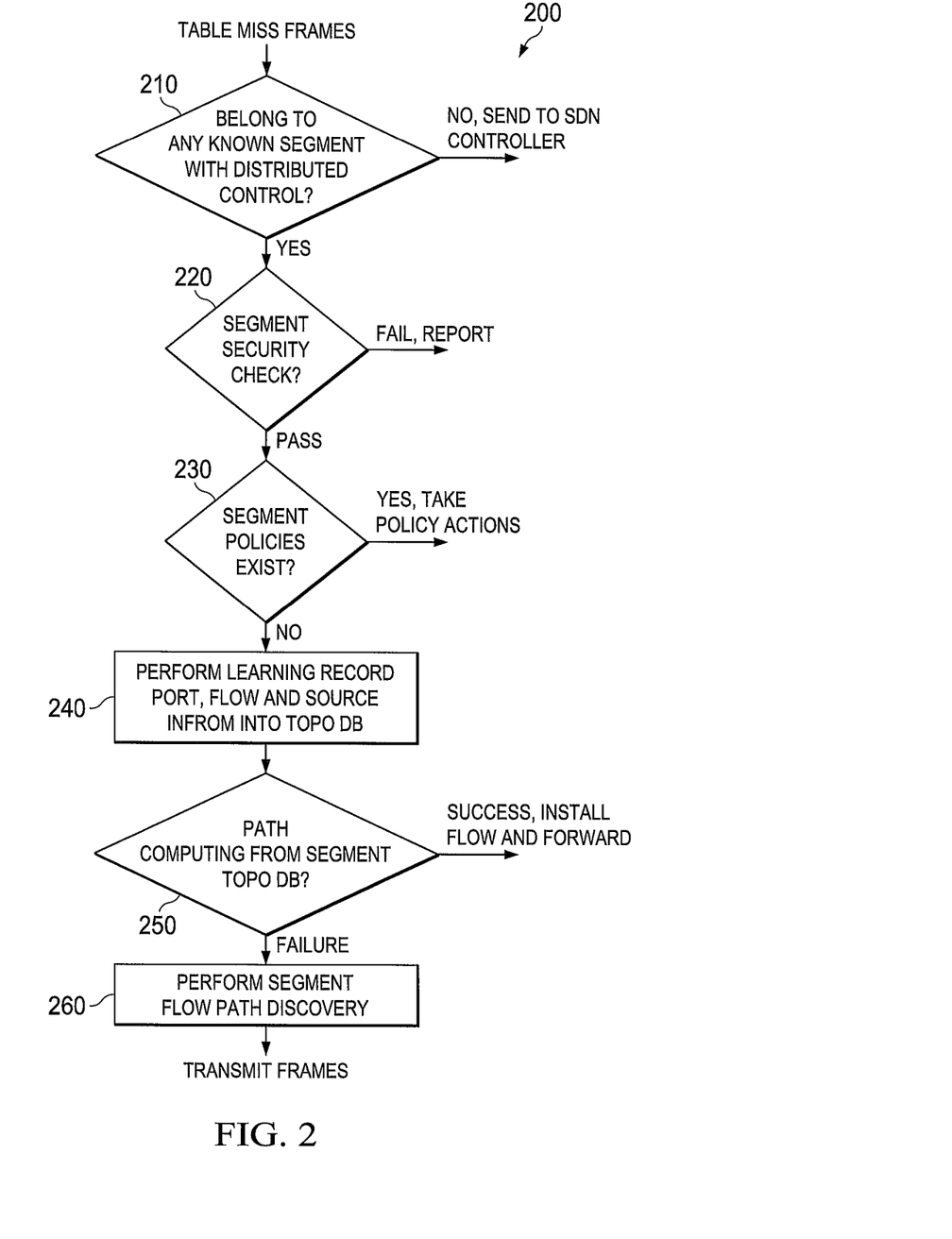
FIG. 2 depicts a flow chart illustrating how the SDN Edge switches take control of segment micro-flows.

FIG. 2 illustrates a flow chart 200 describing how the SDN Edge switches 130 take control of segment micro-flows according to the present disclosure.

At step 210, an Edge switch 130 receives micro-flow frames experiencing table miss in datapath, and determines if they belong to any known segment with distributed control. If no, they are sent to the SDN controller 120.

If yes, at step 220 the Edge switch 130 performs a security check. If the security check fails, a failure report is issued.

If the segment security check passes, step 230 the Edge switch 130 checks to see if a segment policy exists. If yes, Edge switch 130 takes policy actions.

If no, at step 240 the Edge switch 130 performs learning, and records relevant flow information such as port, flow and source into its database.

At step 250, the Edge switch 130 performs path computing from the segment topology database. If successful, the flow is installed and forwarded.

If it fails, at step 260 the Edge switch 130 performs segment flow path discovery, and the frames of the micro-flow are transmitted using discovery path.

A segment topology database is built up at each of Edge switches 130 through learning within each segment, and is used for flow path computing. The topology database is configured to record all information related to the segment, the source (virtual) port and source info, and all other relevant flow information. The SDN Edge switch 130 employs different path computation algorithms for the micro-flows with different level of granularities.

Figure 3:
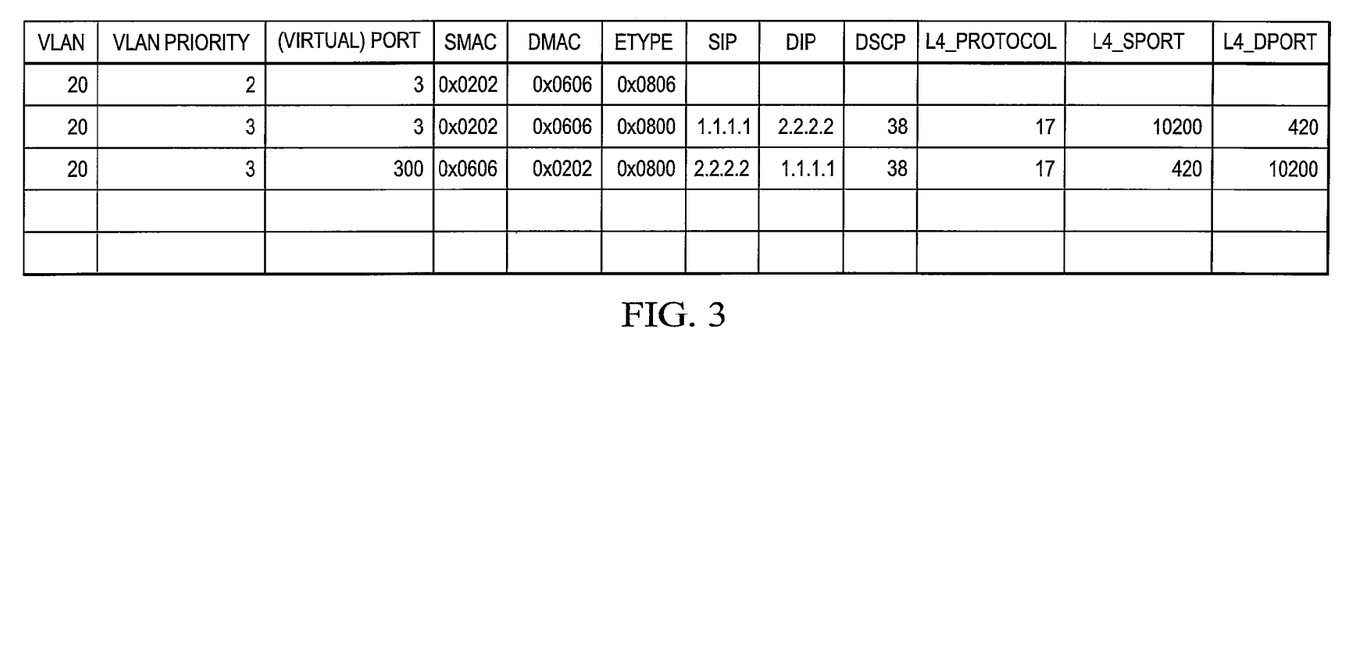
FIG. 3 illustrates an example of a topology database.

FIG. 3 shows an example of a topology database for an Edge switch 130.

Figure 4A:
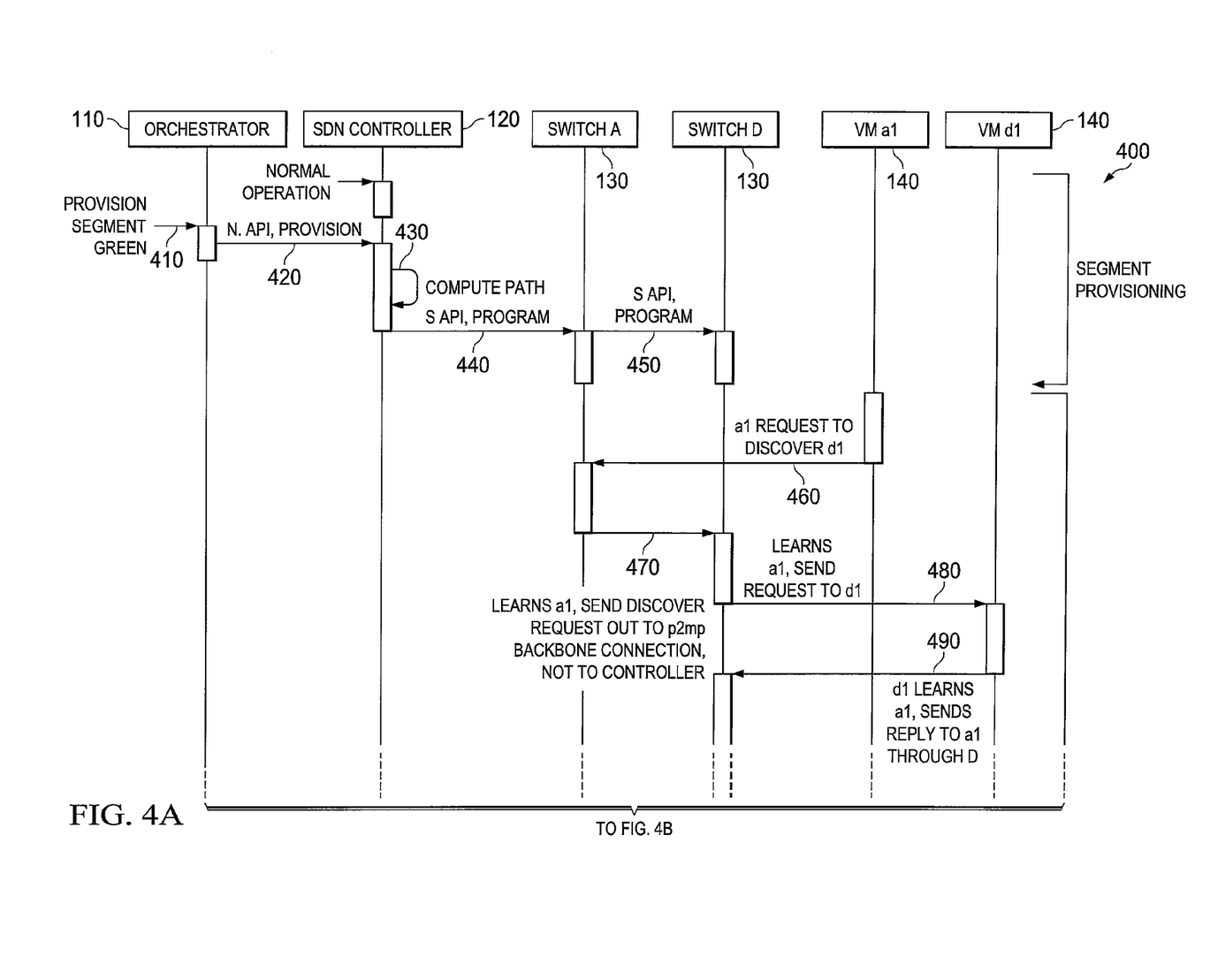
FIGS. 4A and 4B illustrate a message flow diagram providing micro-flow control at the Edge network devices.
Figure 4B:
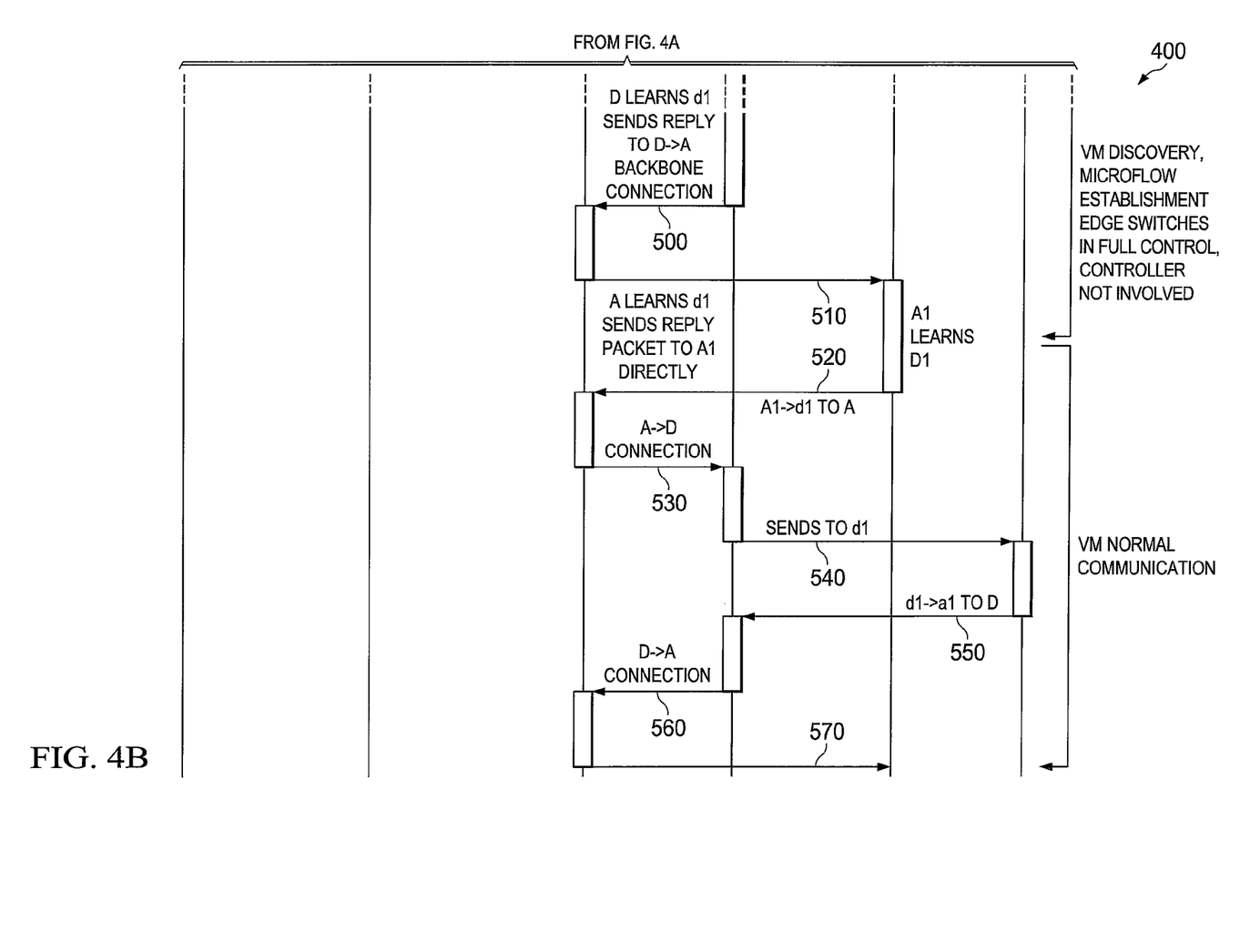

Referring to FIGS. 4A and 4B, there is shown a message flow diagram at 400 for the paradigm providing micro-flow control at the Edge network devices 130. The diagram is slightly simplified, with the assumption that all normal security checks mentioned in FIG. 2 pass and no segment policy is configured, hence both steps are ignored in the flow diagram.

At step 410, orchestrator 110 receives provisioning for a segment between VM a1 a2, a3, a4 and switch A.

At step 420, the segment provisioning begins with orchestrator 110 provisioning the SDN controller 120 using the northbound API.

At step 430, the SDN controller 120 computes a segment path.

At step 440, the SDN controller 120 programs switch A using the southbound API.

At step 450, the SDN controller 120 programs switch D using the southbound API.

At step 460, the VM a1 140 sends a packet to switch A to discover VM d1.

At step 470, switch A receives the discovery packet and identifies it as a packet belonging to the configured segment; assume switch A doesn't yet know how to forward this packet, since this segment uses distributed micro-flow control, this packet is sent to the distributed control module. Switch A then learns VM a1, and sends the discover packet out to p2mp backbone connection, and not to the SDN controller 120.

At step 480, edge switch D receive the discovery packet, learns VM a1, and sends the discover packet to local ports, one of the copy reaches VM d1.

At step 490, VM d1 receives the discovery packet, learns VM a1, and sends a reply packet to VM a1 through switch D.

At step 500, switch D receives the reply packet, learns VM d1, computes the flow path, and sends the reply packet towards a1 using the computed path, which is the segment backbone connection connecting switch D to switch A.

At step 510, switch A receives the data reply packet, learns VM d1, computes the flow path, and sends a reply to VM a1 directly. VM a1 receives the reply packet and completes the discovery. VM discovery is completed, VM a1 and VM d1 are learned by each other as well as by the edge switches A and D, where the edge switch A and D are in full control, while SDN controller 120 is not involved for the micro-flows.

At step 520, VM a1 sends a normal data request packet to VM d1 through switch A.

At step 530, switch A receives the data request packet; switch A doesn't yet know the flow but already has VM d1 information in its topology database, so its control module computes the flow path, installs the flow, and forwards the packet after due encapsulation using the computed path which is the segment backbone connection connecting switch A to switch D; further packets of the same flow will use the same path. The data request packet reaches switch D.

At step 540, switch D receives the data request packet; same as switch A, switch D control module computes the path, install the flow and sends data request packet to VM d1 using the computed path which is the direct connection to VM d1 after due decapsulation. Further packets of the same flow will follow the same installed flow path. VM d1 receives the data request packet.

At step 550, as a response to the data request packet in step [0053], VM d1 sends a data reply packet back to VM a1 through switch D.

At step 560, switch D receives the data reply packet; switch D doesn't yet know the flow but has VM a1 information in its topology database, its control module installs the flow path, and forwards the packet using the computed path which is the segment backbone connection connecting switch D to switch A, after due encapsulation.

At step 570, switch A receives the data reply packet; switch A doesn't yet know the flow but already has VM a1 in its topology database, so its control module computes the flow path, install the flow and forward the packet using the computed path which is the direct connection to VM a1 after due decapsulation; VM a1 receives the data reply packet. Now the VM a1 to VM d1 two way communication micro-flow path setup is complete, where the edge switch A and D are in full control, while SDN controller 120 is not involved for the micro-flows.

In summary, this disclosure provides separation of the SDN network control into 2 tiers, a top tier called macro-flow control, and a bottom tier called micro-flow control.

It allows the SDN controllers to control macro-flows—the segment backbone connections or macro flows. The SDN controllers are relieved from initial packets processing, path computation and flow management for the micro-flows for all virtual segments. This allows the SDN controllers to scale to larger networks, and make SDN a more acceptable and competitive technology in real network deployment scenarios.

It allows the SDN network edge devices to control micro-flows for virtual segments in a distributed fashion. This allows the network to scale to more stations and more segment micro-flows, as these micro-flows are only managed and processed by network edge devices they pass through.

This paradigm allows much faster new micro-flow creation, as the micro-flows are only processed by the SDN network edge devices they pass through.

Since each SDN network edge device learns station addresses for virtual segments, the network topology change converges much faster. This also leads to faster station migration convergence.

This paradigm works side by side with the conventional data-driven paradigm. i.e., within an SDN network. In a network implementing this hybrid paradigm, flows other than segment micro-flows will still be controlled by SDN controllers in centralized fashion. Some SDN network devices can employ this paradigm, process and manage virtual segment micro-flows; some other network devices can work in a conventional way, delegate micro-flow processing to SDN controllers. This is not the most efficient way, but it provides a migration choice.

Figure 5:
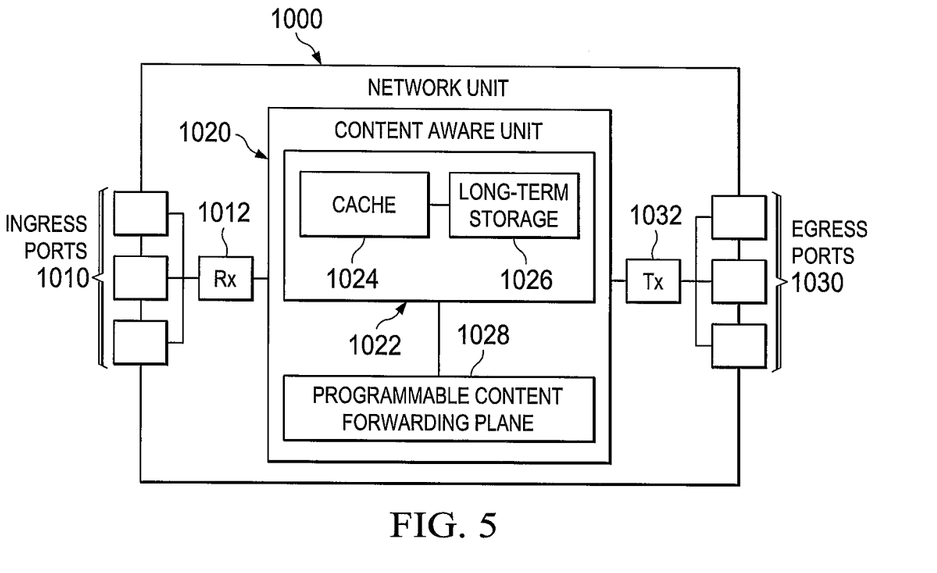
FIG. 5 illustrates an embodiment of a network unit.

FIG. 5 illustrates an embodiment of a network unit 1000, which may be any device that transports and processes data through network 100, including through the SDN switch 120 and network devices 130 according to the present disclosure. For instance, the network unit 1000 may correspond to or may be located in any of the system nodes described above, such as a MN, PoA, content router R/edge router ER, local controller LC, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 5.

The content aware unit 1020 may also comprise a programmable content forwarding plane block 1028 and one or more storage blocks 1022 that may be coupled to the programmable content forwarding plane block 1028. The programmable content forwarding plane block 1028' may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 6:
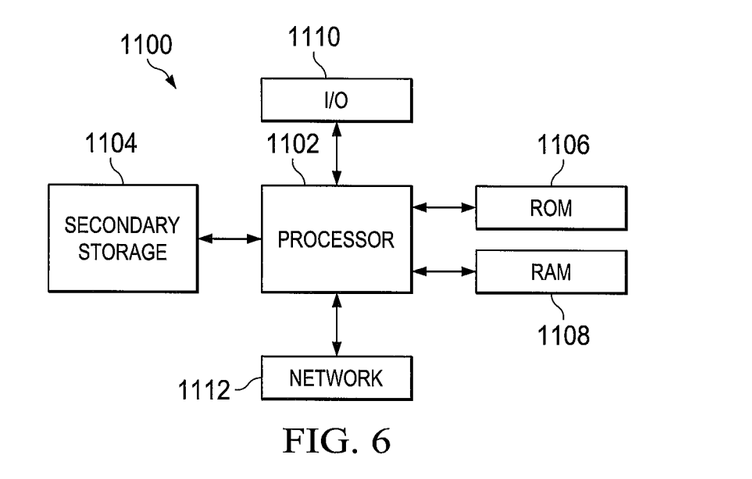
FIG. 6 illustrates a typical, general-purpose network component.

The network components described above may be implemented on any general-purpose network component, such as a computer or network component with sufficient processing power, memory resources, and network throughput capability to handle the necessary workload placed upon it. FIG. 6 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of data flow control in software defined networking (SDN), comprising:
    an SDN controller controlling top tier macro-flows and virtual segment backbone connections in a network; and
    an SDN network edge device controlling and managing micro-flows for the virtual segments in the network that are attached to the SDN network edge device.

2. The method as specified in claim 1 wherein the SDN network edge device controls and manages the micro-flows locally without using a southbound API coupling the SDN controller to the SDN network edge device.

3. The method as specified in claim 1 wherein the SDN network edge device learns flow information, source information and incoming port information for all segment unknown micro-flows, and builds a virtual segment topology database.

4. The method as specified in claim 3 wherein the SDN network edge device employs flow computation algorithms and micro-flow management in a distributed fashion.

5. The method as specified in claim 1 wherein the virtual segment backbone connections are naturally exposed to the SDN controller through provisioning.

6. The method as specified in claim 1 wherein the SDN network edge device enables and disables segment micro-flow distributed control, and implements security check, policy control, topology discovery and building, and path computing algorithms for the micro-flows.

7. A method of flow control in software defined networking (SDN), comprising:
    an SDN network edge device controlling and managing micro-flows for virtual segments in a network that are attached to the SDN network edge device, without using a southbound API coupled to an SDN controller for the micro-flows.

8. The method as specified in claim 7 wherein the SDN network edge device learns all relevant flow information including source information and incoming port information for all segment unknown micro-flows, and builds a virtual segment topology database.

9. The method as specified in claim 7 wherein the SDN network edge device employs flow computation algorithms and micro-flow management in a distributed fashion.

10. The method as specified in claim 7 wherein the SDN network edge device controls bottom tier micro-flows for the virtual segments, and an SDN controller controls top tier macro-flows for the virtual segments.

11. A software defined networking (SDN) network edge device, comprising:
    a control module configured to control and manage micro-flows for virtual segments in a network that are attached to the SDN network edge device, without using a southbound API coupled to an SDN controller for the micro-flows.

12. The SDN network edge device as specified in claim 11 wherein the SDN network edge device is configured to learn flow information, source information and incoming port information for all segment unknown micro-flows, and build a virtual segment topology database.

13. The SDN network edge device as specified in claim 11 wherein the SDN network edge device is configured to employ flow computation algorithms and micro-flow management in a distributed fashion.

14. The SDN network edge device as specified in claim 11 wherein the SDN edge device is configured to control bottom tier micro-flows for the virtual segments.

15. A system configured to provide data flow control in software defined networking (SDN), comprising:
    an SDN controller configured to control top tier macro-flows and virtual segment backbone connections in a network; and
    an SDN network edge device coupled to the SDN controller by a southbound application programming interface (API), the SDN network edge device configured to control and manage micro-flows for the virtual segments in the network that are attached to the SDN network edge device.

16. The system as specified in claim 15 wherein the SDN network edge device is configured to control and manage the micro-flows locally without using the southbound API.

17. The system as specified in claim 15 wherein the SDN network edge device is configured to learn all relevant flow information including source information and incoming port information for all segment unknown micro-flows, and build a virtual segment topology database.

18. The system as specified in claim 17 wherein the SDN network edge device is configured to employ flow computation algorithms and micro-flow management in a distributed fashion.

19. The system as specified in claim 15 wherein the virtual segment backbone connection is naturally exposed to the SDN controller through provisioning.

20. The system as specified in claim 15 wherein the SDN network edge device is configured to enable and disable segment micro-flow distributed control, and implement security check, policy control, topology discovery and building, and path computing algorithms for the micro-flows.

* * * * *